INVENTORS.
WILLIAM A. THORNTON, Jr.
WILLI LEHMANN.
BY
ATTORNEY.

United States Patent Office 3,152,994
Patented Oct. 13, 1964

3,152,994
METHOD FOR PROCESSING ELECTROLUMINESCENT PHOSPHOR AND ELECTROLUMINESCENT DEVICE
William A. Thornton, Jr., Cranford, and Willi Lehmann, Livingston, N.J., assignors to Westinghouse Electric Corporation, East Pittsburgh, Pa., a corporation of Pennsylvania
Filed Dec. 9, 1960, Ser. No. 74,800
15 Claims. (Cl. 252—301.6)

This invention relates to electroluminescence and, more particularly, to a method for processing electroluminescent phosphor and an electroluminescent device incorporating such processed phosphor.

The phenomenon of electroluminescence was first disclosed by G. Destriau, one of his earlier publications appearing in London, Edinburgh and Dublin Philosophical Magazine, Series 7, volume 38, No. 285, pages 700–737 (October 1947). Since this early publication, electroluminescent devices have been marketed commercially. The efficiency of electroluminescent devices in converting electrical energy to visible energy has not been as good as desired, sometimes resulting in generation of excessive heat in order to achieve a desired level of light. Also, the light intensity obtainable from such devices has not been of as high a level as desired, at least under the usual conditions of operation. Further, the energization level at which electroluminescent devices most efficiently convert electrical energy into visible light has normally occurred at relatively low levels of light emission and when the energizing electric field is increased in order to increase the light output, the efficiency of conversion of electrical energy to visible energy normally drops considerably. These factors have limited the commercial application of electroluminescent devices.

It is the general object of this invention to provide a method for processing electroluminescent phosphor in order to increase the efficiency of electroluminescent devices incorporating such phosphor.

It is another object to provide a method for processing electroluminescent phosphor in order to improve the light output obtainable from electroluminescent devices incorporating such phosphor.

It is a further object to provide a method for processing electroluminescent phosphor in order that devices incorporating such phosphor can efficiently convert electrical energy to visible energy while still producing a relatively high level of light output.

It is an additional object to provide an electroluminescent device which incorporates phosphor which has been specially processed, in order to improve the operating performance characteristics of such a device.

The aforesaid objects of the invention, and other objects which will become apparent as the description proceeds, are achieved by providing a method for improving electroluminescent phosphor after it has been prepared by firing. In this method, the finely divided phosphor is placed into an aqueous solution containing cyanide salt, dissolved and ionized to form cyanide radicals. The salt is present in such amount as to provide a normality for the dissolved cyanide salt of at least about 0.4. The solution and phosphor are heated to a temperature of from 120° C. to 250° C. and this temperature is maintained for at least one minute. Thereafter the phosphor is removed from the solution and residual solution is washed from the surfaces of the processed phosphor. After drying, the phosphor is incorporated into electroluminescent devices in accordance with conventional practices and the performance characteristics of electroluminescent devices which incorporate such processed phosphor are improved.

For a better understanding of the invention, reference should be had to the accompanying drawing wherein.

Electroluminescent phosphor which has been processed in accordance with the present invention can be used with any type of electroluminescent device, such as an imaging apparatus. The present phosphor, however, has particular utility with respect to electroluminescent devices which are intended to serve as light sources and such devices have been illustrated and will be described.

Figure 1:
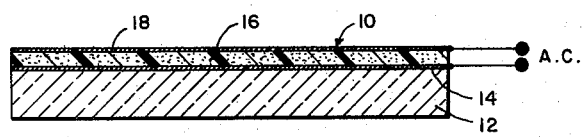
FIG. 1 is a sectional elevational view of an electroluminescent device which incorporates electroluminescent phosphor processed in accordance with the present invention.

With specific reference to the form of the invention illustrated in the drawings, in FIG. 1 is illustrated an electroluminescent device 10 which generally comprises a glass foundation 12 having carried thereon a first electrode 14 which is formed of a thin layer of tin oxide. Coated over the electrode 14 is layer 16 comprising electroluminescent phosphor and coated over the layer 16 is a second electrode 18 which is formed of vacuum metallized aluminum or copper iodide for example. An alternating electric potential is adapted to be applied across the electrodes 14 and 18 in order to energize the electroluminescent device to light emission.

The tin oxide electrode layer 14 can also be formed of other suitable light-transmitting, electrically conducting material such as indium or titanium oxides or copper iodide, for example. In this specific example the phosphor, which has been previously processed as explained hereinafter, is mixed with equal parts by weight of a light-transmitting dielectric such as polyvinyl chloride and the thickness of the layer 16 is approximately two mils. The thickness of the layer 16 is not critical and can be varied considerably. The relative proportions of phosphor and dielectric can also be varied. As an alternative embodiment, the plastic dielectric can be replaced by a glass or ceramic dielectric and such constructions are well known. As still another alternative construction, the dielectric can be dispensed with entirely and the powdered phosphor per se compacted between the device electrodes. This latter device construction can be energized to light emission by D.C. as well as A.C.

Figure 2:
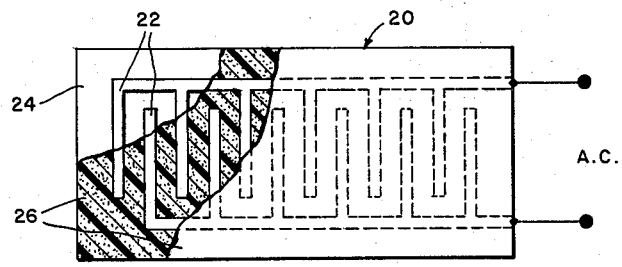
FIG. 2 is a plan view, partly broken away, of an electroluminescent device incorporating electroluminescent phosphor processed in accordance with the present invention and wherein the electrodes are formed as an interlacing, raster-type grid.
Figure 3:
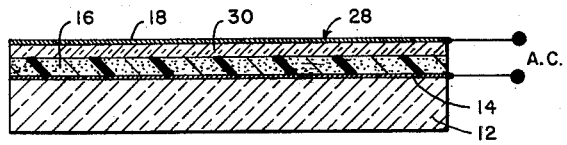
FIG. 3 is a sectional elevational view of an alternative device construction generally corresponding to FIG. 1, but wherein an additional layer of dielectric material is also included between the device electrodes.

The device embodiment 20, as shown in FIG. 2, is fabricated generally as disclosed in FIG. 3 of U.S. Patent No. 2,684,450, dated July 20, 1954. Briefly, this device embodiment comprises interlacing, raster-type electrodes 22 which are formed on an insulating foundation 24 and the processed phosphor 26, with or without mixed dielectric, is carried between the interlacing electrodes 22.

The device embodiment 28, as shown in FIG. 3, corresponds to the embodiment 10, as shown in FIG. 1, except that an additional layer 30 of dielectric material, such as barium titanate or titania or polyvinyl chloride is also included between the lamp electrodes 14 and 18. Particularly in the case of barium titanate or titania, the energizing potential applied across the lamp electrodes can be increased and because of the high dielectric constant of such material, an increased electric field can be applied across the phosphor to increase the brightness of the device. All of the foregoing electroluminescent device constructions essentially comprise spaced electrodes wherein particles of finely divided electroluminescent phosphor, which has been specially processed as explained hereinafter, are included between the spaced electrodes.

The best electroluminescent phosphors have as their host crystal or matrix Group IIB metal combined with sulphur, or selenium, or mixtures thereof. Such phosphors also include copper in activator proportions. In preparing copper-activated electroluminescent phosphors in accordance with conventional practices, it is necessary to include in the raw mix an excess of copper over that amount which is normally regarded as required to activate the matrix to cause such material to be responsive to ultraviolet excitation. After the phosphor is prepared by firing, it is crushed to finely divided status and then washed in a solution which is a good solvent for cuprous sulfide, but which is not a good solvent for zinc sulfide. Apparently this washing technique removes excess cuprous sulfide from the surface of the phosphor while leaving cuprous sulfide segregations dispersed throughout the phosphor. The washing also changes the body color of the phosphor from the charcteristic dark color of cuprous sulfide to a generally whitish color.

The most usual electroluminescent phosphor utilizes zinc sulfide as matrix material with copper as activator. Other known activators can be used to supplement the copper in order to change the emission characteristics of the phosphor, examples of such other known activators being manganese or lead. The usual electroluminescent phosphor also includes a sufficient amount of coactivator material, differing by two in valence from the copper activator, in order to achieve good electroluminescent response. The requirement for such a coactivator is well known and apparently this material serves to compensate the charges within the phosphor matrix to enable the primary activator to be assimilated. Known suitable coactivators for electroluminescent phosphors are chlorine, bromine, iodine, aluminum, scandium, gallium or indium, or mixtures thereof. While the usual matrix for electroluminescent phosphor is zinc sulfide, other Group IIB metals, or mixtures thereof, can be used as matrix material. For example, in copending application S.N. 807,730, filed April 20, 1959, and owned by the present assignee, there is disclosed a zinc-mercuric sulfide phosphor which is activated by copper and a zinc-cadmium-mercuric sulfide phosphor which is activated by copper. While sulphur is the usual anion constituent of the phosphor matrix, selenium can also be utilized, in order to achieve different emission characteristics, and Group IIB metal selenide or sulfo-selenide electroluminescent phosphors are also known. Selenium acts in a manner similar to sulphur with respect to forming cuprous selenide segregations, the excess amounts of which are removed by a wash such as described hereinbefore, in order to achieve best electroluminescent response.

In accordance with the present invention, any electroluminescent phosphor having a matrix consisting essentially of Group IIB metal combined with sulphur or selenium or sulfo-selenide and also including copper in activator proportions is first prepared in accordance with conventional techniques by firing the raw-mix materials under predetermined conditions in order to form the phosphor material. As a specific example, copper-activated zinc sulfide electroluminescent phosphor will be considered. Such a phosphor is initially prepared by mixing 1000 grams of zinc sulfide with 30 grams of sulphur, 12.8 grams of copper acetate and 4.5 grams of ammonium chloride. This mixture is fired in a partially closed container in a nitrogen atmosphere at a temperature of about 950° C. for about 100 minutes. Thereafter, the phosphor is slightly crushed, 30 grams of sulphur are added to the phosphor and it is refired in a similar manner. After final firing, the phosphor is lightly crushed to reduce it to finely divided status and it is then processed in accordance with the present invention. The state of division of the finely divided phosphor is in no way critical and is subject to considerable variation, depending upon the firing conditions and other variables. As an example, the foregoing finely divided copper-activated zinc sulfide electroluminescent phosphor will have an average particle diameter of about ten to fourteen microns.

Figure 4:
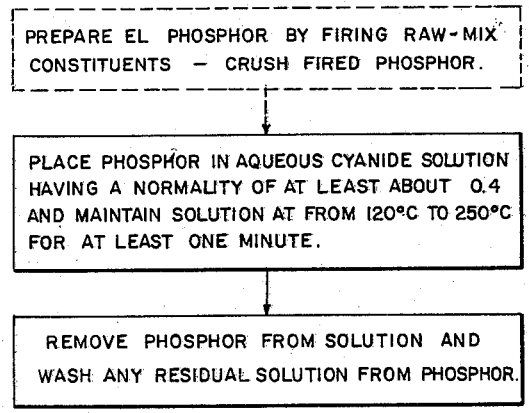
FIG. 4 is a flow chart illustrating the method steps employed in the present invention.

In accordance with the present invention, and as shown in the flow diagram in FIG. 4, the fired, finely divided phosphor is placed into an aqeuous solution containing dissolved cyanide salt which is ionized to form cyanide radicals. The dissolved cyanide salt is present in amount sufficient to provide a normality for such dissolved salt of at least about 0.4. There does not appear to be any maximum limitation with respect to the concentration of the dissolved cyanide salt. As a specific example, twenty grams of the specific finely divided phosphor as described hereinbefore are placed into a solution containing fifty grams of sodium cyanide and ten grams of sodium hydroxide dissolved in 100 cc. of water. The cyanide solution is desirably made alkaline, as indicated, in order to inhibit any tendency for the formation of hydrogen cyanide. The solution which contains the phosphor therein is maintained at a temperature of from 120° C. to 250° C. for a period of at least one minute and temperatures within this indicated range are required to improve the phosphor performance characteristics appreciably. The phosphor can be added to the hot solvent solution and maintained within the indicated temperature range or the phosphor can be added to cold solvent solution, which is later heated to the indicated degree.

An aqueous solvent solution of sodium cyanide made alkaline by the addition of a small amount of sodium hydroxide will boil, under atmospheric conditions, at a temperature just slightly greater than 100° C. In order to increase the temperature of the solution to from 120° C. to 250° C., special processing techniques must be utilized. One such technique to increase the temperature of the solvent solution is to place the solution and phosphor into a pressure container, which is then heated. The temperature within the pressure container is readily controlled by varying the heat which is applied thereto. The preferred temperature at which the solution is maintained is about 150° C. As a specific example, ten milliliters of the foregoing solvent solution containing two grams of the phosphor are placed into a pressure container which is heated to a temperature of 150° C. This temperature is maintained for a total period of twenty to sixty minutes. Thereafter, the pressure container is cooled and the phosphor removed from the solvent solution. The finely divided phosphor is then rinsed several times with distilled water in order to remove any residual solvent solution and two to three rinses generally are satisfactory. The water-rinse phosphor is preferably given a final rinse with ethanol in order to facilitate drying, which drying preferably is accelerated by heating the phosphor to approximately 120° C.

As a second method for washing the phosphor while maintaining the solvent solution at elevated temperatures, the sodium hydroxide concentration in the solvent solution is greatly increased, in order to increase the boiling point of the aqueous solvent solution. As a specific example, the solvent solution is formed by dissolving 30 grams of sodium cyanide and 100 grams of sodium hydroxide in 100 cc. of water. This solution will boil, at atmospheric pressure, at approximately 150° C. To this solvent solution is added twenty grams of the foregoing finely divided, fired phosphor. The solution preferably is boiled for approximately twenty to sixty minutes. Alternatively, solution tempertaures within the indicated range of from 120° C. to 250° C. can be obtained under normal atmospheric conditions, without boiling, by using very large additions of hydroxide. Thereafter the phosphor is separated from the solvent solution, residual solution is washed from the phosphor and the phosphor is dried as specified hereinbefore. If it is desired to boil the solvent solution at a temperature of approximately 120° C., fifty grams of sodium hydroxide are used in the foregoing solvent solution. If it is desired to boil the solvent solution at a temperature of approximately 250° C., 1,000 grams of sodium hydroxide are dissolved in the solution.

Apparently the elevated temperatures serve to cause the washing solution to dissolve excess cuprous sulfide more effectively to promote electroluminescence. The maximum beneficial effects to be obtained appear to be dependent upon a time-temperature relationship. For this reason, when using solution temperatures which are toward the lower end of the foregoing indicated temperature range of from 120° C. to 250° C., it is desirable to use a somewhat prolonged washing period, in order to obtain best results. There does not appear to be any maximum limitation to the washing time which can be used. When using solution temperatures toward the upper end of the foregoing indicated temperature range of from 120° C. to 250° C., however, the phosphor may display some tendencies for yellowing, if the washing is continued for a prolonged period of time. Such yellowing does impair somewhat the maximum light output which is obtainable, although the performance characteristics of the processed phosphor are still improved. For the foregoing reasons, phosphors which are processed in accordance with the present invention desirably are washed for shorter periods of time when using temperatures toward the upper end of the foregoing temperature range and for longer periods of time when using temperatures toward the lower end of the foregoing temperature range. As an example, a washing period of one hour is quite satisfactory when the solvent solution temperature is 120° C. and a washing period of two minutes is generally satisfactory when the solvent solution temperature is 250° C.

In controlled tests, batches of several phosphors were first prepared and each batch separated into two lots. One of each of the separated phosphor lots was placed in the solvent solution which was maintained at the preferred temperature of 150° C. for a period of twenty minutes. The other separated phosphor lots, which constituted the controls, were boiled in a cyanide solution at a temperature of approximately 100° C. for a period of twenty minutes. The washed phosphor lots were rinsed to remove traces of solvent solution and dried. These phosphors were incorporated into identical test electroluminescent cells. The cells which incorporated the phosphor processed with the solvent solution at elevated temperatures, in accordance with the present invention displayed a maximum efficiency varying from 20% to 60% greater than the efficiency of the control cells. The differences in efficiency increases which were realized apparently were due to processing variations or to different phosphors which were used in the tests. In all cases, however the efficiencies of the electroluminescent cells incorporating the phosphors which were processed in accordance with the present invention were appreciably increased over the control cells. The maximum brightnesses realized were also greater for the cells incorporating the improved phosphor, varying from a 15% increase up to a 22% increase in maximum brightness.

A further very important improvement which was realized was a shift of the peak efficiency toward the higher applied field strengths. In explanation, the maximum brightness obtainable with an electroluminescent cell is limited by that voltage which will cause an electrical breakdown to occur between the cell electrodes. In order to provide some margin of safety, it has been customary to rate electroluminescent cells or operation at a voltage which amounts to about two-thirds of that voltage required to cause an electrical breakdown between the electrodes. In the control cells wherein the phosphor was embedded in polyvinyl chloride plastic dielectric, the maximum efficiency was realized at an excitation of approximately one-third of breakdown voltage. At this value of applied voltage, the brightness of the control cells was relatively low. When the applied voltage was increased to approximately two-thirds of the breakdown voltage, i.e., the usual rated voltage; the efficiency of conversion of electrical energy to visible energy had dropped appreciably. In similar test electroluminescent cells incorporating phosphor processed in accordance with the present invention, the point of maximum efficiency occurred at an excitation voltage which was approximately two-thirds of the voltage required to cause electrical breakdown. Thus for these improved cells, the peak of efficiency occurred at a point which approximated that applied voltage at which the cells were intended to be operated. As indicated, the actual degree of improvement with respect to increased efficiency, increased brightness and shift of peak efficiency varied somewhat from test to test. In all cases, however, the overall performance for the test electroluminescent cells incorporating the present improved phosphor was greatly improved as compared to the performance of the test electroluminescent cells incorporating the control phosphor.

The foregoing description has considered in detail an aqueous cyanide solution which utilizes sodium cyanide. It should be understood that any water-soluble cyanide salt which will ionize to form cyanide radicals can be substituted for the preferred sodium cyanide. As an example, potassium cyanide or strontium cyanide can be used if desired. Preferably the solvent solution is made alkaline by the addition of sodium hydroxide. Other hydroxides can be substituted therefor, such as potassium or strontium hydroxide. In the case the solution is intended to have an elevated boiling point at atmospheric pressure, it is preferred to use sodium or potassium hydroxide, since these bases are very soluble in water and relatively large amounts of such material additions are required to increase the boiling point to the indicated degree.

It will be recognized that the objects of the invention have been achieved by providing a method for processing electroluminescent phosphor in order to increase the efficiency of electroluminescent devices incorporating such phosphor. In addition, the light output obtainable from such devices has been improved and the point of maximum efficiency for such devices has been shifted toward the rated voltage at which the devices are intended to operate. There has also been provided an electroluminescent device which incorporates phosphor which has been specially processed by an improved method.

While best embodiments of the invention have been illustrated and described in detail, it is to be particularly understood that the invention is not limited thereto or thereby.

We claim:

1. The method of improving the electroluminescent response obtainable from fired finely divided electroluminescent phosphor having a matrix consisting essentially of Group IIB metal combined with at least one material of the group consisting of sulphur and selenium and also including copper in activator proportions, which method comprises, placing said finely divided phosphor in an aqueous solution containing dissolved cyanide salt ionized to form cyanide radicals and in amount sufficient to provide a normality for such dissolved cyanide salt of at least about 0.4, maintaining said solution with the phosphor therein at a temperature of from 120° C. to 250° C. for a period of at least one minute, thereafter removing said phosphor from said solution, and washing residual solution from the surfaces of said finely divided phosphor.

2. The method as specified in claim 1, wherein said solution is alkaline.

3. The method as specified in claim 1, wherein the higher the solution temperature within the specified temperature range, the shorter the time which said phosphor is maintained therein, and the lower the solution temperature within the specified temperature range, the longer the time which said phosphor is maintained therein.

4. The method of improving the electroluminescent response obtainable from fired finely divided electroluminescent phosphor having a matrix consisting essentially of Group IIB metal combined with at least one material of the group consisting of sulphur and selenium and also including copper in activator proportions, which method comprises, placing said finely divided phosphor in an alkaline aqueous solution containing dissolved cyanide salt ionized to form cyanide radicals and in amount sufficient to provide a normality for such dissolved cyanide salt of at least about 0.4, maintaining said solution with the phosphor therein at a temperature of about 150° C. for a period of from twenty to sixty minutes, thereafter removing said phosphor from said solution, and washing residual solution from the surfaces of said finely divided phosphor.

5. The method of improving the electroluminescent response obtainable from fired finely divided electroluminescent phosphor having a zinc sulfide matrix and including coper in activator proportions, which method comprises, placing said finely divided phosphor in an aqueous solution containing dissolved cyanide salt ionized to form cyanide radicals and in amount sufficient to provide a normality for such dissolved cyanide salt of at least about 0.4, maintaining said solution with the phosphor therein at a temperature of from 120° C. to 250° C. for a period of at least one minute, thereafter removing said phosphor from said solution, and washing residual solution from the surfaces of said finely divided phosphor.

6. The method of improving the electroluminescent response obtainable from fired finely divided electroluminescent phosphor having a matrix consisting essentially of Group IIB metal combined with at least one material of the group consisting of sulphur and selenium and also including copper in activator proportions, which method comprises, placing said fired phosphor in an aqueous solution containing dissolved cyanide salt ionized to form cyanide radicals and in amount sufficient to provide a normality for such dissolved salt of at least about 0.4, enclosing in a pressure container said phosphor and said solvent solution, applying heat to said pressure container to raise the temperature therein to from 120° C. to 250° C., maintaining the temperature within said container at from 120° C. to 250° C. for a period of at least one minute, thereafter removing phosphor from said solution, and washing residual solution from the surfaces of said finely divided phosphor.

7. The method as specified in claim 6, wherein said solution is alkaline.

8. The method as specified in claim 6, wherein the higher the solution temperature within the specified temperature range, the shorter the time which said phosphor is maintained therein, and the lower the solution temperature within the specified temperature range, the longer the time which said phosphor is maintained therein.

9. The method of improving the electroluminescent response obtainable from fired finely divided electroluminescent phosphor having a matrix consisting essentially of Group IIB metal combined with at least one material of the group consisting of sulphur and selenium and also including copper in activator proportions, which method comprises, placing said fired phosphor in an alkaline aqueous solution containing dissolved cyanide salt ionized to form cyanide radicals and in amount sufficient to provide a normality for such dissolved salt of at least about 0.4, enclosing in a pressure container said phosphor and said solvent solution, applying heat to said pressure container to raise the temperature therein to about 150° C., maintaining the temperature within said container at from about 150° C. for a period of from twenty to sixty minutes, thereafter removing phosphor from said solution, and washing residual solution from the surfaces of said finely divided phosphor.

10. The method of improving the electroluminescent response obtainable from fired finely divided electroluminescent phosphor having a zinc sulfide matrix and including copper in activator proportions, which method comprises, placing said fired phosphor in an aqueous solution containing dissolved cyanide salt ionized to form cyanide radicals and in amount sufficient to provide a normality for such dissolved salt of at least about 0.4, enclosing in a pressure container said phosphor and said solvent solution, applying heat to said pressure container to raise the temperature therein to from 120° C. to 250° C., maintaining the temperature within said container at from 120° C. to 250° C. for a period of at least one minute, thereafter removing phosphor from said solution, and washing residual solution from the surfaces of said finely divided phosphor.

11. The method of improving the electroluminescent response obtainable from fired finely divided electroluminescent phosphor having a matrix consisting essentially of Group IIB metal combined with at least one material of the group consisting of sulphur and selenium and also including copper in activator proportions, which method comprises, placing said fired phosphor in an alkaline aqueous solution containing dissolved cyanide salt ionized to form cyanide radicals and in amount sufficient to provide a normality for such dissolved salt of at least about 0.4 and which solution has a boiling point at atmospheric pressure of from 120° C. to 250° C., applying heat to said solution to cause same to heat to a temperature of from 120° C. to 250° C., maintaining said solution in heated condition for at least one minute, thereafter removing said phosphor from said solution, and washing residual solution from the surfaces of said finely divided phosphor.

12. The method as specified in claim 11, wherein the higher the solution temperature within the specified temperature range, the shorter the time which said phosphor is maintained therein, and the lower the solution temperature within the specified temperature range, the longer the time which said phosphor is maintained therein.

13. The method of improving the electroluminescent response obtainable from fired finely divided electroluminescent phosphor having a matrix consisting essentially of Group IIB metal combined with at least one material of the group consisting of sulphur and selenium and also including copper in activator proportions, which method comprises, placing said fired phosphor in an alkaline aqueous solution containing dissolved cyanide salt ionized to form cyanide radicals and in amount sufficient to provide a normality for such dissolved salt of at least about 0.4 and which solution has a boiling point at atmospheric pressure of about 150° C., applying heat to said solution to cause same to boil, maintaining said solution in boiling condition for from twenty to sixty minutes, thereafter removing said phosphor from said solution, and washing residual solution from the surfaces of said finely divided phosphor.

14. The method of improving the electroluminescent response obtainable from fired finely divided electroluminescent phosphor having a zinc sulfide matrix and including copper in activator proportions, which method comprises, placing said fired phosphor in an alkaline aqueous solution containing dissolved cyanide salt ionized to form cyanide radicals and in amount sufficient to provide a normality for such dissolved salt of at least about 0.4 and which solution has a boiling point at atmospheric pressure of from 120° C. to 250° C., applying heat to said solution to cause same to boil, maintaining said solution in boiling condition for at least one minute, thereafter removing said phosphor from said solution, and washing residual solution from the surfaces of said finely divided phosphor.

15. The method as specified in claim 14, wherein the boiling point at atmospheric pressure of said solution is principally determined by including therein a predetermined quantity of sodium hydroxide to locate the solution boiling point at atmospheric pressure within the indicated temperature range.

References Cited in the file of this patent
UNITED STATES PATENTS

| | | |
|---|---|---|
| 2,874,128 | Wachtel | Feb. 17, 1959 |
| 2,929,974 | Mash | Mar. 15, 1960 |
| 2,950,257 | Froelich | Aug. 23, 1960 |
| 2,965,580 | Umberger | Dec. 20, 1960 |
| 2,972,694 | Thornton | Feb. 21, 1961 |